Feb. 18, 1941. H. R. GROSS 2,232,448
LAMP SUPPORT
Filed Nov. 21, 1938 2 Sheets-Sheet 2
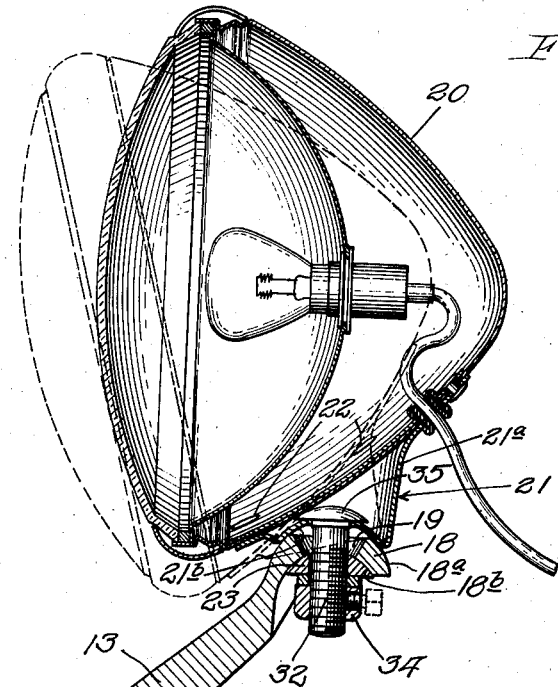
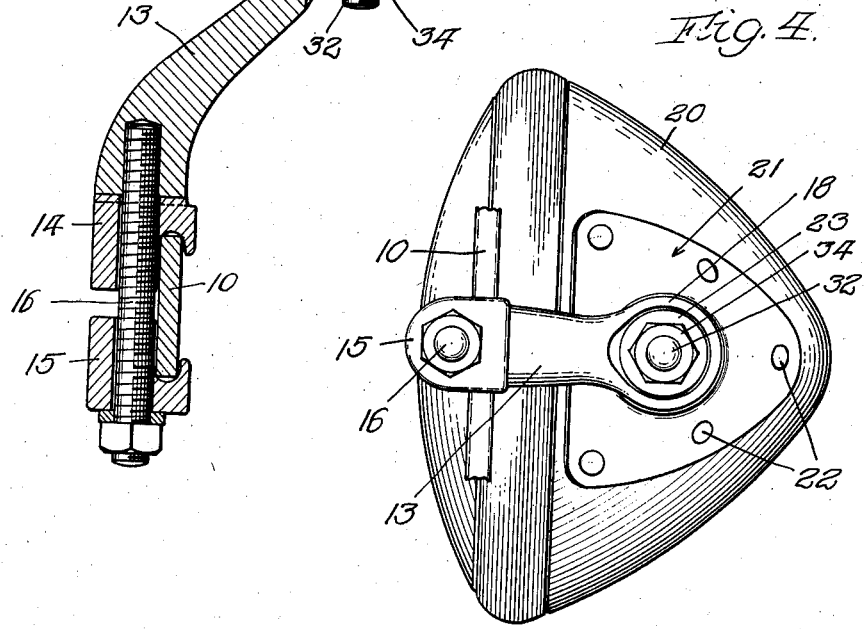
Inventor:
Henry R. Gross,
By Chritton, Wiles, Davies, Hinckle & Vannon,
Attys.

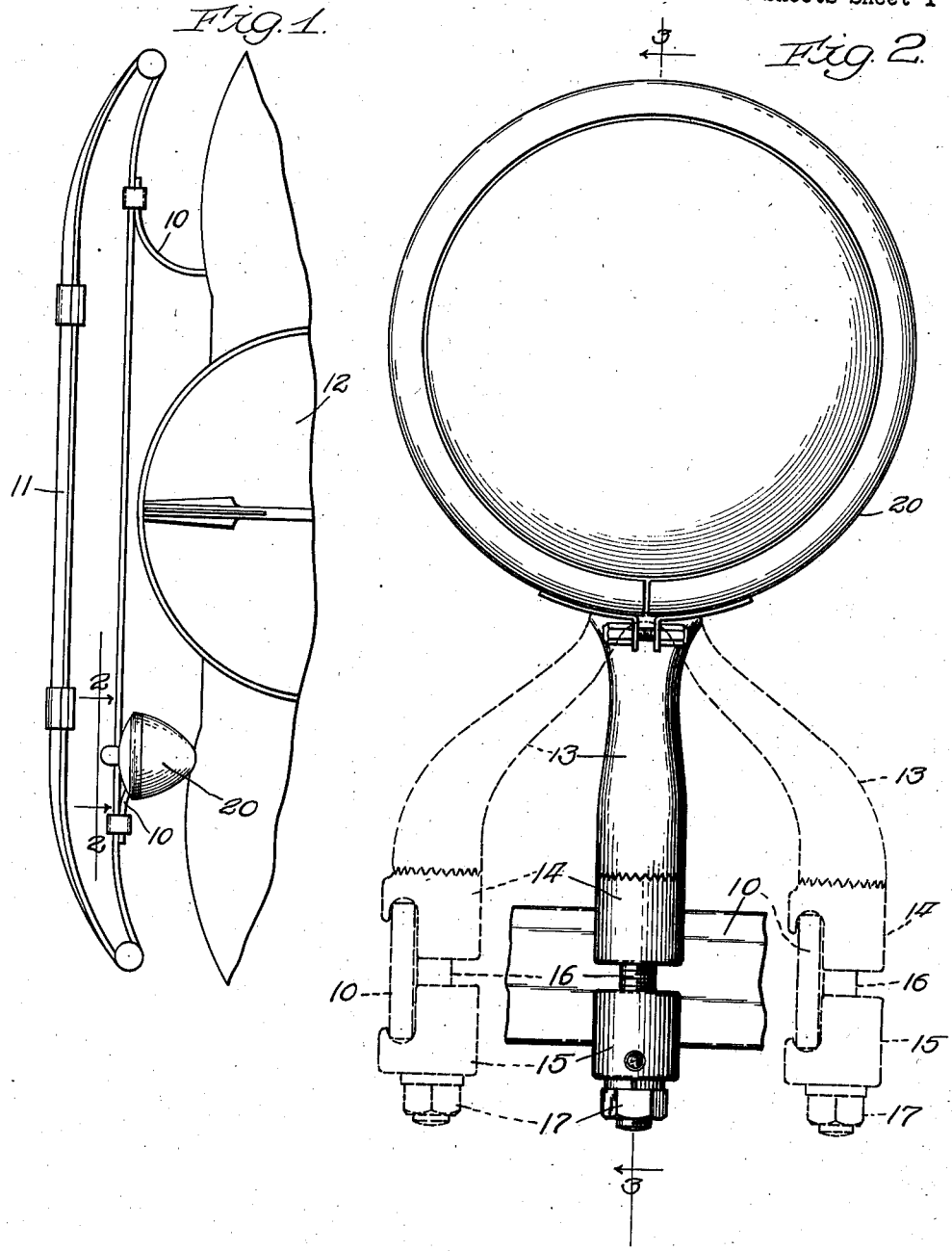

Patented Feb. 18, 1941

2,232,448

UNITED STATES PATENT OFFICE 2,232,448

LAMP SUPPORT

Henry R. Gross, Chicago, Ill.

Application November 21, 1938, Serial No. 241,697

1 Claim. (Cl. 248—226)

This invention relates to improvements in lamp and support and more especially a support for a so-called road lamp or fog lamp designed particularly for use on motor vehicles.

Lamps of the character named are mounted at the front of the vehicle rather close to the road, and heretofore difficulty has been encountered in providing a suitable support for the same that is adapted for ready attachment to and detachment from the vehicle.

Among the features of my invention is the provision of such a support with means permitting its quick attachment to a part of the vehicle at the front, particularly a portion of the front bumper support. My improved support may be readily attached to bumper supports of various gauges. In the event of injury to the lamp or forward portion of the vehicle, the lamp can be easily and quickly detached for repair and replacement purposes.

Another feature of my invention is the provision of such a support provided with a universal mounting for the lamp itself. Lamps of the character named must be rather accurately and finely adjusted in order to direct the beam to the correct place and prevent glare interference with oncoming drivers. Means are provided in my improved support for easily and accurately adjusting the lamp on the support in the desired position.

Another feature of my invention is improved means for attaching the supporting means to the shell of the lamp.

Another feature of my invention is improved construction in connection with one of the members forming a portion of the lamp support.

Other features and advantages of my invention will appear more fully as I proceed with my specification.

In that form of device embodying the features of my invention shown in the accompanying drawings—Fig. 1 is a top plan view showing the lamp mounted on a bumper support; Fig. 2 is a view in front elevation taken as indicated by the line 2 of Fig. 1; Fig. 3 is a vertical sectional view; and Fig. 4 is a bottom plan view.

As shown in the drawings, 10 indicates, for example, one of the side supports for a front bumper 11 carried by a motor vehicle 12. For the purpose of illustrating the invention I have here shown the lamp support as attached to one of these side bumper members 10. It is to be understood, however, that my improved support is so made that it is adapted for ready attachment to other portions of the vehicle as desired.

To this end it is provided with two relatively movable jaws which may be drawn together to clamp any suitable part of the vehicle between them and thus furnish a strong rigid mounting or support for the lamp.

My improved support includes a curved bracket member 13 provided at its lower end with two relatively movable jaws, namely, the upper jaw 14 and the lower jaw 15. Suitable means are provided for drawing these jaws together to clamp the bumper part 10, or other suitable part between them. As here shown, for this purpose, there is provided the bolt 16 extending through the jaws and adapted to be tightened by the nut 17.

The upper end of the bracket 13 is provided with a horizontal lamp support 18 having a convex upper surface 18a and a concave lower surface 18b. This support 18 is provided with a central aperture 19.

20 indicates the lamp itself and, as here shown, this lamp is provided on its under surface with a plate 21 attached to the shell of the lamp 20 by means of rivets 22, 22. The plate 21 is pressed out of sheet metal and has formed therein a hollow base portion 21a, the lower surface 21b of which is apertured and curved or concaved to fit on the convex seat 18a of the support 18. 32 indicates a bolt extending through the aperture in the base 21a carrying the convex washer 33 and nut 34. 35 indicates the head of the bolt which lies inside of the hollow base 21a. The nut 34 is adapted to be tightened to grip the support 18 between the convex washer 33 and the part 21b of the base 21a. The hole 19 in the support 18 is large enough to permit universal adjustment of the bolt 32 therein. That is, the lower part 21b of the base 21a of the lamp may be moved about on the convex surface or seat 18a of the support to any desired position, within limits, and the nut 34 then tightened to clamp the lamp firmly in position. By means of this construction the lamp is angularly adjustable on the support 18.

The shoulder of the bolt 32 next to the head 35 is preferably squared and the hole in the part 21b is squared to fit it to prevent turning of the bolt.

Formation of the base 21a on the lamp greatly facilitates the construction of the lamp and makes a strong, rigid structure which is cheaply manufactured.

While there are shown and described certain embodiments of the invention, it is to be understood that it is capable of many modifications. Changes, therefore, in the construction and arrangement may be made without departing from the spirit and scope of the invention as disclosed in the appended claim, in which it is intended to claim all novelty inherent in the invention as broadly as permissible, in view of the prior art.

What I claim as new, and desire to secure by Letters Patent is:

Apparatus of the character described, including, a bracket having its lower end serrated, a bolt threaded into the lower end of the bracket, and a pair of relatively movable jaws mounted on the bolt, the upper surface of the upper jaw being serrated, whereby, tightening of the bolt will simultaneously tighten the jaws and bring the serrated lower end of the bracket and the serrated upper surface of the upper jaw into frictional engagement.

HENRY R. GROSS.